United States Patent [19]
Zellmer

[11] 4,312,029
[45] Jan. 19, 1982

[54] DC-TO-DC CONVERTER WITH REDUCED POWER LOSS DURING TURN OFF

[75] Inventor: Neale A. Zellmer, Belmont, Calif.

[73] Assignee: GTE Automatic Electric Laboratories, Inc., Northlake, Ill.

[21] Appl. No.: 51,090

[22] Filed: Jun. 22, 1979

[51] Int. Cl.³ .......................................... H02M 3/335
[52] U.S. Cl. .................................... 363/21; 323/289; 307/280; 307/300
[58] Field of Search ..................... 363/18–21, 363/97, 131–134; 323/17, DIG. 1, 22 T, 289; 307/280, 300

[56] References Cited

U.S. PATENT DOCUMENTS

| | | | |
|---|---|---|---|
| 3,569,792 | 3/1971 | Schroeder | 307/300 |
| 3,600,666 | 8/1971 | Gliever | 323/DIG. 1 |
| 3,697,852 | 10/1972 | Gerbitz | 363/21 |
| 3,736,495 | 5/1973 | Calkin et al. | 323/DIG. 1 |
| 3,742,242 | 6/1973 | Morio et al. | 363/21 |

OTHER PUBLICATIONS

John Svalbe, "Packaged Pulse Width Modulator Simplifies Series Switching Regulator Design", Electronic Design 19, Sep., 14, 1972, p. 172.
R. W. Hilsher, "Constant Period with Variable Duty Cycle Obtained from 555 Timer with Single Control", Electronic Design 14, Jul. 5, 1975, p. 72.
R. Solomon et al., "DC-DC Converter Using IC Timer", Electronic Design News, Sep. 5, 1973, pp. 87–91.
P. W. Cowett, Jr., "Switching Supply Converts −60 Volt to +5 V and ±6.3 V with 83% Efficiency", Electronic Design 2, Jan. 18, 1978, p. 106.

*Primary Examiner*—William M. Shoop
*Assistant Examiner*—Peter S. Wong
*Attorney, Agent, or Firm*—Russell A. Cannon

[57] ABSTRACT

The base electrode of the switching transistor in a converter is resistively connected to the output terminal of a pulse width modulator and connected through first and second series connected diodes to a ground reference potential which is also connected to the emitter of the transistor, the junction between the diodes being electrically connected through a large capacitor to the modulator output terminal. Voltage pulses at the output terminal cause the transistor to pass collector current and the second diode to conduct for charging the capacitor. On termination of voltage pulses, the modulator connects the output terminal thereof to ground. This causes the charge voltage on the capacitor to turn the first diode on to pull the base voltage sharply negative for rapidly drawing minority carriers out of the base region. This allows the base-emitter interelectrode capacitance of the switching transistor to discharge sooner for rapidly reducing the flow of collector current and decreasing power dissipation in the transistor during turnoff thereof.

1 Claim, 3 Drawing Figures

DC-TO-DC CONVERTER WITH REDUCED POWER LOSS DURING TURN OFF

BACKGROUND OF INVENTION

This invention relates to switching converters, and more particularly to an improved technique for reducing power loss in the converter during turnoff of the switching transistor thereof.

A prior art switching converter comprises an inductor, load resistor, and emitter-collector path of a switching transistor electrically connected in series across a source of DC voltage, a commutating diode being connected across the series combination of the inductor and load resistor. When the switching transistor conducts in saturation, the collector current is high and the collector-emitter voltage approximately 0 volts. When the transistor starts to turn off, the emitter-collector voltage rises abruptly to its full value, whereas turnoff of collector current is delayed by the presence of minority carriers in the base region. (See curves 101 and 102 in FIG. 2) This rise in collector voltage while collector current is still flowing can cause excessive power dissipation in and result in overheating of the switching transistor. In order to decrease such power loss, the regulator in U.S. Pat. No. 3,736,495, issued May 29, 1973, "Switching Regulator With High Frequency Turnoff Loss Reduction Circuit" by Calkin, et al, connects capacitive energy storage means across the commutating diode for slowing down the rise in emitter-collector voltage of the switching transistor. Although this technique improves efficiency, it also slows down the switching operation of the regulator. A different approach is described in U.S. Pat. No. 3,697,852, Oct. 10, 1972, "Transistor Switching Regulator" by Clarence G. Gerbitz. The Gerbitz regulator requires high voltage switching transistors having emitter-collector paths electrically connected to ground through a control circuit comprising high-speed low-voltage transistors which are turned on and off. The bases of these switching transistors are connected through a shunt connected resistor and junction diode to a positive bias voltage. When transistors in the control circuit are cut off, the principal conduction path in the switching transistors is interrupted. Since collector current is still flowing there, however, their base voltages rise sufficiently to turn on the junction diode to provide reverse base drive for switching the operating point of the switching transistors more rapidly through the region of high dissipation (column 3, line 60). This technique requires a bias voltage, special control circuitry, high voltage switching transistors, and as a relatively high power loss since two transistors are conducting in series during the on-cycle.

An object of this invention is the provision of improved circuitry in a switching converter for rapidly changing the operating state of a switching transistor thereof for reducing power loss in the transistor during turnoff thereof.

SUMMARY OF INVENTION

In accordance with this invention, a voltage converter having a switching transistor responsive to voltage pulses of one polarity that are applied to the base thereof for causing the transistor to conduct collector current through inductive means includes the improvement comprising means responsive to termination of voltage pulses for coupling to the base a signal potential of the opposite polarity that is much larger than that required to cut off the base-emitter junction diode of the transistor for drawing minority carriers out of the base region in order to discharge the base-emitter interelectrode capacitance of the transistor earlier for rapidly reducing the flow of collector current and decreasing power dissipation in the transistor during turnoff thereof. In one embodiment in which the coupling means comprises a capacitor and a resistor connected between the base and one side of the capacitor, first and second diodes are electrically connected between the base and a supply voltage, with the junction of the diodes connected to the other side of the capacitor, for selectively controlling charging and discharging of the latter. In another embodiment, the coupling means comprises a resistor connected across the series combination of a battery and a diode.

DESCRIPTION OF DRAWING

This invention will be more fully understood from the following detailed description of preferred embodiments thereof, together with the drawing in which.

DESCRIPTION OF PREFERRED EMBODIMENTS

Figure 1:
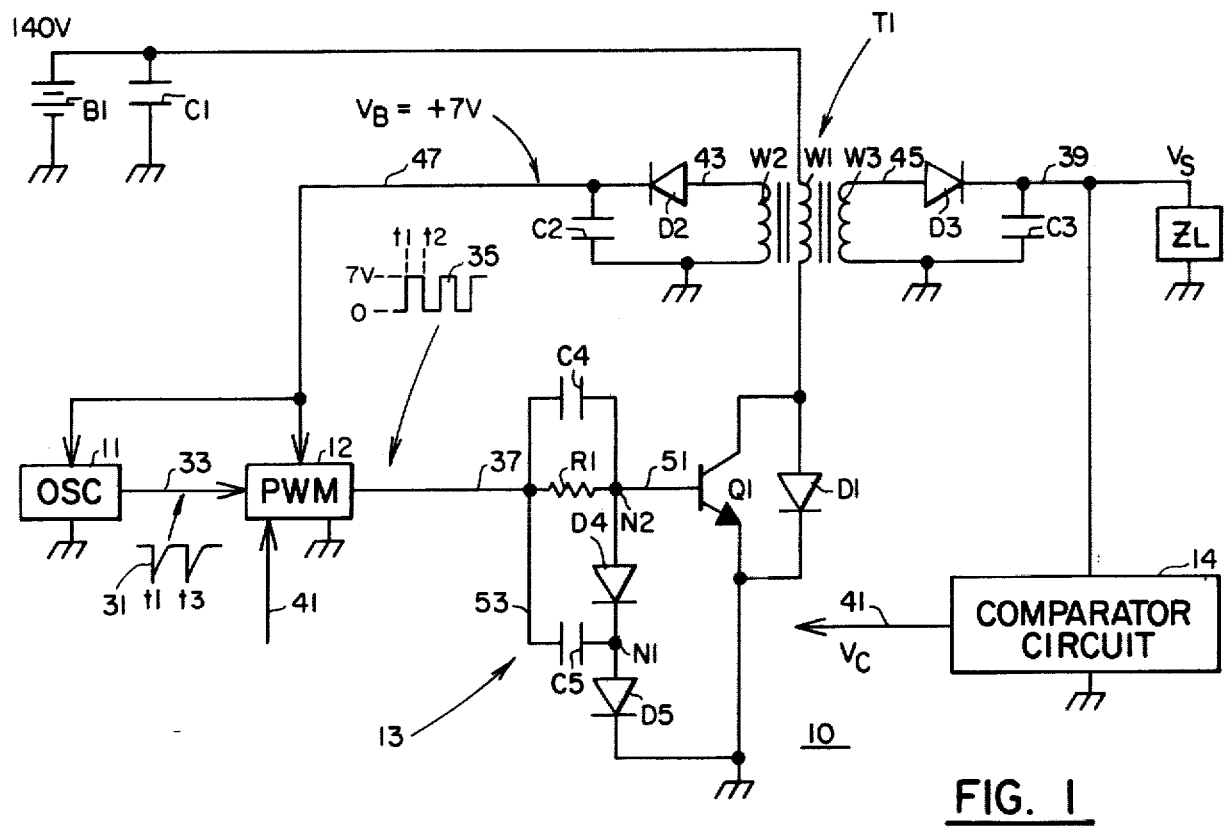
FIG. 1 is a schematic circuit and block diagram of a regulated power supply embodying this invention.

The power supply of FIG. 1 is essentially a constant frequency switching regulator comprising oscillator 11, pulse width modulator 12, DC-to-DC converter 13, and comparator circuit 14. The oscillator produces fixed frequency clock pulses 31 that key the modulator for establishing the times that it produces voltage pulses 35 on line 37. These voltage pulses 35 drive the switching transistor Q1 of the converter 13 for causing it to produce an output voltage $V_S$ on line 39. The circuit 14 compares the output voltage $V_S$ with an internally generated reference voltage $V_R$ for producing a control voltage $V_C$ that biases the modulator for varying the width of pulses 35 and thus the duty cycle of the converter as is well known in the art. The feedback loop in the regulator comprises output line 39, comparator 14, modulator 12, line 37, and the converter. This loop causes the width of voltage pulses 35 and thus the length of the energy storage state of the converter to be shortened and lengthened as the load impedance $Z_L$ increases and decreases, respectively, for maintaining the voltage $V_S$ relatively constant. The regulator is conventional except for the control circuitry in the Q1 base circuit. Pulse width modulators are described in the articles "Packaged Pulse Width Modulator Simplifies Series Switching Regulator Design" by John Svalbe, Electronic Design 19, Sept. 14, 1972, pg. 172, and "Constant Period With Variable Duty Cycle Obtained From 555 Timer With Single Control" by Robert W. Hilsher, Electronic Design 14, July 5, 1975, pg. 72. Switching converters are described in "DC-DC Converter Using IC Timer" by Robert Solomon and Robert Broadway, Electronic Design News, Sept. 5, 1973, pgs. 87-91 and "Switching Supply Converts −60 Volt to +5 V and ±6.3 V with 83% Efficiency" by Phillip W. Cowett, Jr., Electronic Design 2, Jan. 18, 1978, pg. 106.

In the converter 13, the series combination of the Q1 collector-emitter path and the primary winding W1 of transformer T1 is connected across a battery B1 and a filter capacitor C1 that provide a constant DC input voltage such as 140 volts. The voltage pulses 35 drive the Q1 base for causing the switching transistor to periodically conduct for producing a magnetic field in W1 that causes AC signal voltages to be coupled into lines 43 and 45. The voltage on line 43 is half-wave rectified by D2 and C2 for providing a DC bus voltage $V_B = +7$ V on line 47. The voltage on line 45 is half-wave rectified by C3 and D3 for producing the output voltage $V_S$ on line 39 that is applied to the load impedance $Z_L$.

The oscillator and modulator are initially energized in a conventional manner by a starter circuit (not shown) that causes the modulator to produce voltage pulses that drive Q1 until the converter produces a $+7$ volt DC bus voltage on line 47 which then powers the oscillator and modulator. The starter may comprise the emitter-collector path of a transistor and a Zener diode that are electrically connected in series across B1 as is a voltage divider having a tap connected to the base electrode of the transistor, its collector being connected to bus 47. Alternatively, the power supply may be started by connecting a 7 volt battery between bus 47 and ground until cyclical operation of the converter is firmly established. The switching frequency of the modulator is preferably constant. The modulator is responsive to the control voltage on line 41 for varying the width of voltage pulses 35. The modulator 12 here may, by way of example, comprise an MC1455 or MC1555 integrated monolithic timing circuit manufactured by Motorola Semi-Conductor Products, Inc., and described in pages 8-43 to 8-49 of their "Semiconductor Data Library", Vol. 6/Series B, copyright 1976, which is incorporated herein by reference. The modulator output circuit may comprise first and second transistors having their emitter-collector paths electrically connected in series between bus 47 and ground. In this modulator and timer, the first transistor conducts and the second transistor is cut off for electrically connecting line 37 to bus 47 when a voltage pulse is to be produced on line 37. Conversely, the second transistor conducts and the first transistor is cut off to internally connect line 37 to ground when the modulator is energized and voltage pulses are to be absent from the output thereof. Circuitry for making these connections is shown in FIG. 13 of the Motorola publication. Series connected transistors for accomplishing this function are said to be in a totum pole configuration.

The base electrode 51 of the NPN switching transistor Q1 is connected to the output terminal 37 of the modulator through a current limiting resistor R1 that has a speed up capacitor C4 connected across it. The Q1 base is also connected through series connected junction diodes D4 and D5 to ground, the node N1 between these diodes being connected through a large capacitor C5 to line 37. The capacitance of C4 is preferably relatively small, whereas the capacitance of C5 is relatively large, being approximately an order of magnitude greater than that of C4. On the leading edge of a voltage pulse 35 at time t1, C4 initially couples the pulse voltage to the Q1 base for causing Q1 to turn on fast and rapidly move into conduction in the saturation region. Since the capacitance of C4 is small, it rapidly charges to 7-volts for presenting a constant voltage across R1 and a constant drive current to the Q1 base. This causes the Q1 collector current to increase linearly and the Q1 base-emitter interelectrode capacitance to charge to approximately $+0.7$ volt. The $+7$ volt pulse voltage on line 37 at this time also causes D5 to conduct through C5 for charging the latter toward $+7$ volts. The other diode D4 is cut off at this time since its anode and cathode are both at approximately $+0.7$ volt.

When a voltage pulse 35 is terminated at time $t_2$, the modulator connects line 37 to ground. This terminates the base drive current in line 51 and Q1 starts to turn off. The $+7$ volt charge voltage on C5 then pulls node N1 negative to approximately $-7.0$ volts. This charge voltage cuts off D5 and causes D4 to conduct for discharging C4 and C5 through R1. This places a negative voltage of approximately 6 volts on node N2 and the Q1 base that rapidly conducts excess minority carriers out of the Q1 base region for rapidly turning Q1 off and decreasing the value of collector current to nearly zero before the Q1 collector-emitter voltage rises significantly. A diode D1 is connected across the Q1 collector-emitter path so as to clamp the Q1 collector at approximately $-0.7$ V if a spurious negative impulse from the magnetic circuit trys to drive the collector more negative.

In a voltage regulator illustrated in FIG. 1 that was built and operated satisfactorily, R1 = 316 ohms, C4 = 200 picofarads, and C5 = 0.05 microfarads. In this regulator, 7-volt pulses 35 having widths of 6 microseconds produced a constant base drive current of approximately 23 milliamperes and a ramp collector current in Q1 that increased to a peak value of 0.3 ampere. This circuit reduced the power dissipation in Q1 on the trailing edge of voltage pulses 35 from 0.4 watt to approximately 0.15 watt.

Figure 2:
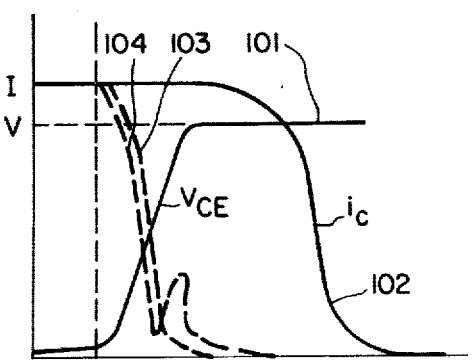
FIG. 2 depicts waveforms useful in explaining the operation of this invention.

Although the capacitance of C5 is preferably much greater than that of C4, e.g., greater than 10 to 20 times that of C4, the C5 capacitance is determined empirically so as to provide the desired operation. The curves 101 and 102 in FIG. 2 show the time variation in the Q1 collector-emitter voltage and collector current in a prior art regulator described earlier and illustrated in U.S. Pat. No. 3,736,495. In that prior art regulator, the collector current and collector-emitter voltage were both high for some time after the negative going edge of a drive pulse 35. During this time, considerable power is dissipated in the switching transistor. It has been determined that as the value of C5 increases, the collector current decreases sooner and the slope of the decay of collector current increases somewhat (as is indicated in curves 103 and 104) so that collector current in Q1 is reduced to a low value prior to there being any significant rise in its collector-emitter voltage. If the capacitance of C5 is increased too far, however, then the collector current decreases sharply to a low value and then bounces back or overshoots to a high value of collector current as the collector-emitter voltage is increasing (see waveform 104). This causes power dissipation in and heating of the transistor. The capacitance of C5 is therefore emperically selected to have a large capacitance that results in a critically damped decay of the Q1 collector current as is indicated by the waveform 103. The magnitude of the pulse voltage and capacitance of C5 are also selected so that the charge voltage developed on C5 during a voltage pulse 35 is much greater than that required to cut off the Q1 base-emitter junction diode, the resistance of R1 enabling C5 to be substantially fully discharged during the time interval between pulses 35. This means that if the magnitude of the pulse voltage is increased, then the capacitance of C5 may be decreased somewhat.

Figure 3:
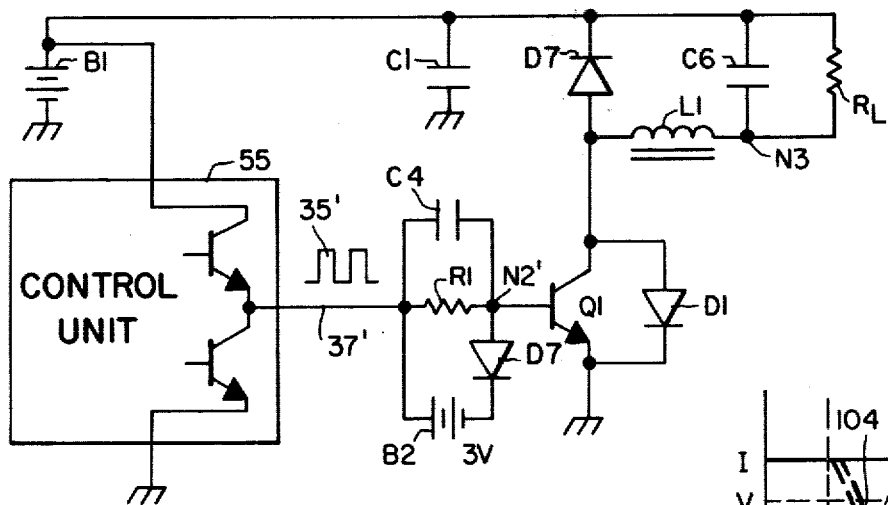
FIG. 3 is a schematic circuit and block diagram of a power supply including an alternate embodiment of this invention.

An alternate embodiment of this invention is illustrated in the switching converter in FIG. 3 in which the Q1 collector-emitter path and an inductor L1 are electrically connected in series with a load resistor $R_L$ and filter capacitor C6, a commutating diode D6 being connected across the series combination of the inductor and load resistor. A control unit 55 produces fixed frequency voltage pulses 35' on line 37' that drive the base of Q1. In a regulated converter of the type illustrated in FIG. 3, the control unit 55 may sense the output voltage at node N3 and compare it with a reference voltage in a comparator thereof (not shown) for automatically varying the width of voltage pulses 35' for regulating the output voltage at node N3. The control unit includes a 555 timer for connecting the output terminal 37' to ground, as was described previously, when the circuit is operating and is not producing voltage pulses on line 37'. In this converter in FIG. 3, opposite sides of a battery B2 are connected directly and through a diode D7 to line 37' and the Q1 base, respectively. The battery B2 voltages is preferably less than the magnitudie of pulses 35' and may be 3 volts. When a voltage pulse 35' is produced by control unit 55, diode D7 is cut off for disconnecting the negative side of B2 from the Q1 base when Q1 conducts collector current through L1. When voltage pulses 35' are absent from line 37' (which is now connected to ground), diode D7 conducts for pulling node N2' negative with respect to ground for sweeping the Q1 base region free of excess minority carriers to enable early discharge of its base-emitter interelectrode capacitance for speeding up turn off of Q1 and reducing the power dissipation in the switching transistor.

Although this invention is described in relation to a preferred embodiment thereof, variations and modifications thereof will occur to those skilled in the art. By way of example, this invention is useful in both regulated and unregulated power supplies as well as both DC-to-DC and DC-to-AC converters. Also, the battery B1 for driving the power supply may be replaced by a source of a varying DC input voltage such as is produced by central office battery voltage equipment that is connected on a cable pair of varying length to subscriber terminal equipment in a carrier subscriber telephone system. Further, the power supplies in FIGS. 1 and 3 may include starter circuitry that is conventional in the prior art for initially energizing the modulator and oscillator and powering the control unit. Additionally, a second diode D8 may be connected in series with D7 to ensure that B2 is not discharged when pulses 35' are present on line 37'. Also, a diode D9 may be connected between the positive side of B2 and line 37'. Further, line 53 and the positive side of B2 may be selectively connected to ground through control means such as a transistor rather than by the operation of the pulse width modulator. The scope of this invention is therefore defined by the appended claims rather than the aforementioned detailed descriptions of preferred embodiments thereof.

What is claimed is:

1. In a voltage converter including a pulse voltage source having an output terminal that is electrically connected through a resistor to the base of a switching transistor that is responsive to voltage pulses of one polarity that are applied to the base thereof for causing the transistor to conduct current through inductive means, the output terminal of the voltage source also being connected to a DC voltage supply terminal only when voltage pulses are absent from the output of the source, the improvement comprising:

a first capacitor for supporting a charge voltage across it that is much greater than that required to cut off the base-emitter diode of the transistor, said first capacitor having one side electrically connected to the output terminal and having an other side;

a second capacitor electrically connected across the resistor, for speeding up turn-on of the transistor in response to generation of a voltage pulse, the capacitance of said first capacitor being much greater than that of said second capacitor;

a first diode electrically connected between the other side of said first capacitor and the supply terminal; and a second diode electrically connected between the other side of said first capacitor and the base;

said first diode being responsive to voltage pulses for conducting and thereby enabling charging of said first capacitor;

said second diode being responsive to the absence of a voltage pulse on the output terminal and to the charge voltage on said first capacitor for conducting and discharging said first capacitor through the resistor for pulling the base in the reverse direction, to rapidly conduct minority carriers out of the base region of the transistor for rapidly terminating the flow of collector current and decreasing power dissipation in the transistor during turnoff.

* * * * *